United States Patent [19]
Okuyama et al.

[11] Patent Number: 5,077,130
[45] Date of Patent: Dec. 31, 1991

[54] CARBON FIBER-REINFORCED CARBON COMPOSITE MATERIAL

[75] Inventors: Kohei Okuyama; Kazushi Matsuura, both of Yokohama, Japan

[73] Assignee: Mitsubishi Kasei Corporation, Tokyo, Japan

[21] Appl. No.: 382,039

[22] Filed: Jul. 18, 1989

Related U.S. Application Data

[63] Continuation of Ser. No. 68,167, Jun. 30, 1987, abandoned.

[30] Foreign Application Priority Data

Jul. 1, 1986 [JP] Japan .................................. 61-154587

[51] Int. Cl.$^5$ ................................................ B32B 9/00
[52] U.S. Cl. .................................... 428/408; 427/228; 428/297; 428/304.4; 428/367
[58] Field of Search ................ 428/367, 408, 376, 398, 428/304, 297; 427/228; 423/447.1, 447.2

[56] References Cited

U.S. PATENT DOCUMENTS

| | | | |
|---|---|---|---|
| 3,416,944 | 12/1968 | Pirrung et al. | 427/228 |
| 3,944,686 | 3/1976 | Froberg | 427/228 |
| 4,048,953 | 9/1977 | Froberg . | |
| 4,178,413 | 12/1979 | DeMunda | 427/228 X |
| 4,339,021 | 7/1982 | Kosuda et al. | 427/228 |
| 4,366,191 | 12/1982 | Gistinger et al. | 427/228 |
| 4,425,256 | 1/1984 | Pilipski | 423/449 |

FOREIGN PATENT DOCUMENTS

| | | |
|---|---|---|
| 1246510 | 8/1967 | Fed. Rep. of Germany . |
| 2042647 | 3/1971 | Fed. Rep. of Germany . |
| 2190728 | 2/1974 | France . |

OTHER PUBLICATIONS

World Patents Index Latest, database, Derwent Pub. Ltd., London, GB, Ascession No. 87-052907, week 08, and Japanese A 62 007 668 (Mitsubishi Chem. Ind. KK) 14-01-1987.
Agency of Industrial Science and Technology, DE--B-1 246 510; col. 3, line 58, col. 4, line 12; claims 1, 2, col. 4, lines 18-24, Example 2.

*Primary Examiner*—Lorraine T. Kendell
*Attorney, Agent, or Firm*—Oblon, Spivak, McClelland, Maier & Neustadt

[57] ABSTRACT

A carbon fiber-reinforced carbon composite material having a porosity of not higher than 20% prepared by subjecting a carbon fiber-reinforced carbon composite material having a porosity of from 25 to 95% to densification treatment, wherein the densification treatment is conducted with pyrolytic carbon formed by the pyrolysis of a halogenated hydrocarbon-containing gas at a temperature of from 400° to 800° C.

7 Claims, No Drawings

CARBON FIBER-REINFORCED CARBON COMPOSITE MATERIAL

This application is a continuation of application Ser. No. 07/068,167, filed on June 30, 1987, now abandoned.

The present invention relates to a carbon fiber-reinforced carbon composite material (hereinafter referred to as "a C/C composite material") having excellent strength and frictional properties.

In general, a C/C composite material is produced by impregnating or mixing a thermosetting resin such as a phenol resin or a furan resin, or a thermoplastic resin such as a pitch material, or polyacrylonitrile-type, pitch-type or rayon-type short or long carbon fibers, hot-pressing the impregnated or mixed material, followed by baking at a temperature of from 600° to 2500° C. in a non-oxidizing atmosphere.

However, the C/C composite material obtained by this method has a high porosity since the carbonization yield of the matrix carbon is from about 40 to about 50%, and it has a drawback that the strength and frictional properties are poor.

Therefore, in order to improve various properties of such conventional C/C composite materials there have been proposed a method wherein a process of heat-treating the molded material, then impregnating a resin or a pitch material thereto and subjecting the impregnated material again to baking, is repeated to fill the resin or pitch material into the pores for densification treatment, and a method wherein by means of chemical vapor deposition, pyrolytic carbon formed at a high temperature of at least 1000° C. from a hydrocarbon material, is filled in the pores of the C/C composite material for densification treatment. If necessary, subsequent to such an operation, a further heating is conducted to obtain a C/C composite material.

However, such conventional densification methods had drawbacks that in the case of the impregnation method, the process was long and cumbersome, and in the case of the chemical vapor deposition method, heat treatment is conducted at a high temperature of at least 1000° C., and the production rate of pyrolytic carbon is so small that a long period of time is required, which in turn leads to a high production cost. The porosity of the C/C composite material obtained by the conventional densification treatment can be reduced to a level of 20% or lower, but such a C/C composite material is not necessarily satisfactory with respect to the strength and frictional properties. Thus, a further improvement has been desired.

Under the circumstances, the present inventors have conducted detailed studies for the densification treatment of C/C composite materials by a chemical vapor deposition method, and have previously proposed to improve the frictional properties by providing a carbon coating layer preferably having a thickness of at least 100 μm on the surface of a C/C composite material by a chemical vapor deposition method using a halogenated hydrocarbon-containing gas (Japanese Patent Application No. 145988/1985). As a result of further studies, it has been found that a similar technique is extremely effective also for the densification, whereby a C/C composite material having excellent strength and frictional properties can be obtained at a low cost. The present invention is based on this discovery.

Namely, the object of the present invention is to provide a C/C composite material having excellent properties obtained by densification treatment to bring the final porosity to a level of not higher than 20%.

This object can readily be accomplished by a carbon fiber-reinforced carbon composite material having a porosity of not higher than 20% prepared by subjecting a carbon fiber-reinforced carbon composite material having a porosity of from 25 to 95% to densification treatment, wherein the densification treatment is conducted with pyrolytic carbon formed by the pyrolysis of a halogenated hydrocarbon-containing gas at a temperature of from 400° to 800° C.

Now, the present invention will be described in detail with reference to the preferred embodiments.

As the carbon fibers for the present invention, any known fibers such as pitch-type, polyacrylonitrile-type or rayon-type carbon fibers can be used. If necessary, inorganic fibers or inorganic materials made of e.g. silicon carbide, alumina or carbon black may be mixed.

Further, as to the shape, the carbon fibers may be used in the form of a woven fabric, a non-woven fabric or short fibers.

To such carbon fibers, a matrix material such as a phenol resin, a furan resin or a petroleum-type or coal-type pitch material, is mixed or impregnated, followed by drying, to obtain a composition comprising carbon fibers and the matrix material. In this case, the matrix material may be used in the form of a solution having a proper viscosity, by dissolving such a material in a solvent such as an alcohol, acetone or anthracene oil.

Then, the composition comprising carbon fibers and the matrix material is adjusted to bring the volume content of carbon fibers to a level of from 10 to 70%, preferably from 20 to 50%, then filled in a mold and press-molded at a temperature of from 100° to 500° C. Then, in an inert gas atmosphere such as nitrogen gas, the temperature is raised at a temperature rising rate of from 1° to 200° C./hr to a level of from 800° to 2000° C., followed by sintering, to obtain a C/C composite material having a porosity of from 25 to 95%, preferably from 30 to 60%.

In the present invention, it is important to conduct densification treatment in such a manner that to this C/C composite material, pyrolytic carbon formed by thermally decomposing a halogenated hydrocarbon as the starting material at a temperature of from 400° to 800° C. usually for from 20 to 1000 hours, is applied so that the pyrolytic carbon fills the pores of the C/C composite material, to obtain a C/C composite material having a porosity of not higher than 20%, preferably from 5 to 15%. The porosity of the resulting C/C composite material can be controlled to a level of not higher than 20% by adjusting the conditions for the chemical vapor deposition reaction e.g. by prolonging the reaction time, or by adjusting the deposition of the pyrolytic carbon, e.g. by lowering the concentration of the reaction gas. Further, depending upon the reaction condition, it may happen that the pyrolytic carbon covers the surface of the C/C composite material and no further densification proceeds. In such a case, the densification treatment by the chemical vapor deposition should be stopped, and after scraping off the surface covering layer of the C/C composite material, the densification treatment may be applied again by a chemical vapor deposition method.

As the halogenated hydrocarbon to be used in the present invention, various halogenated hydrocarbons including chlorinated hydrocarbons such as dichloroethylene, dichloroethane and trichloroethane, may be employed. Among them, chlorinated hydrocarbons wherein the halogen atom is a chlorine atom, and the molar ratio of the halogen atom to the hydrogen atom is equal, are preferred, since the deposition rate is high and it is thereby possible to reduce the production cost.

Further, the above-halogenated hydrocarbon is preferably used in combination with a carrier gas such as nitrogen, argon or hydrogen, and it is reacted with the C/C composite material heated to a level of from 400° to 800° C. by e.g. a high frequency induction heating coil, to conduct densification treatment usually for a period of at least 20 hours, as the case requires.

By the densification treatment under such reaction conditions, the pyrolytic carbon formed in the pores of the C/C composite material has a lattice spacing of graphite crystal of at least 3.7 Å and a crystal thickness of at most 12 Å, as measured by an X-ray diffraction method.

This C/C composite material may be subjected to further heat treatment, as the case requires, whereby graphitization of the pyrolytic carbon further proceeds to form a graphite crystal structure having a lattice spacing of not higher than 3.6 Å and a crystal thickness of at most 13 Å. The C/C composite material having such a matrix layer will be excellent in the strength and frictional properties.

Further, in the present invention, the densification treatment may be conducted solely by the densification treatment by the chemical vapor deposition using the halogenated hydrocarbon according to the present invention, or may be conducted by a combination of the method of the present invention with a conventional densification method by the impregnation and baking of a pitch material or resin, or with a densification method by a conventional chemical vapor deposition method using a hydrocarbon as the starting material.

Namely, in the present invention, it is important that pyrolytic carbon having the structure specified by the X-ray diffraction method is precipitated by a chemical vapor deposition method, and filled in the pores of the C/C composite material for the densification treatment of the C/C composite material.

According to the present invention, it is possible to produce a C/C composite material having excellent strength and frictional properties at a low cost by a single process such that the densification treatment of the C/C composite material is conducted by a chemical vapor deposition method by using a halogenated hydrocarbon.

Now, the present invention will be described in further detail with reference to Examples. However, it should be understood that the present invention is by no means restricted to such specific Examples.

EXAMPLE 1

21 parts by weight of pitch-type carbon fibers having a length of 10 mm were mixed with about 79 parts by weight of an ethanol solution of a phenol resin, and the mixture was dried for one day and night. The mixture was then filled in a mold, and molded and cured at a temperature of 250° C. to obtain a molded product having a carbon fiber content of 50%.

This molded product was baked in a heating furnace in an argon atmosphere at 2000° C. to obtain a C/C composite material having a porosity of 48%.

The C/C composite material thus obtained was placed in an apparatus for chemical vapor deposition, and chemical vapor deposition treatment was conducted by heating the composite material at 650° C. by a high frequency induction heating, while supplying 13% by volume of dichloroethylene vapor with argon gas as a carrier gas for 70 hours from the lower portion of the apparatus, whereby densification treatment was carried out by filling the pyrolytic carbon in the pores of the C/C composite material to obtain a C/C composite material having a porosity of 13%.

This C/C composite material was again subjected to heat treatment in an argon atmosphere at 2000° C. to obtain a C/C composite material of the present invention.

The C/C composite material thus obtained was machined into a disk form. The abrasion test was conducted by abrading a pair of disks to each other. The results are shown in Table 1.

Further, the three-point flexural strength was measured. The results are also shown in Table 1.

COMPARATIVE EXAMPLE 1

The C/C composite material having a porosity of 48% obtained in Example 1 prior to the chemical vapor deposition treatment, was impregnated with a liquid pitch having a temperature of about 200° C., and then baked in a heating furnace at 800° C. in an argon atmosphere. Under the same treating conditions, the impregnation and baking operation was repeated eight times, so that the matrix of the carbonized pitch is filled in the pores of the C/C composite material for densification treatment, whereby a C/C composite material having a porosity of 13% was obtained. This C/C composite material was subjected to heat treatment at 2000° C. in an argon atmosphere in the same manner as in Example 1, followed by the same abrasion test and the three-point flexural strength test. The results are shown in Table 1.

EXAMPLE 2

A C/C composite material having porosity of 22% was obtained in the same manner as in Example 1 except that the densification treatment was conducted by filling pyrolytic carbon in the pores of the C/C composite material by a chemical vapor deposition treatment for 10 hours. Then, the same impregnation and baking operation as conducted in Comparative Example 1, was repeated four times to fill the carbonized pitch matrix in the pores of the C/C composite material to obtain a C/C composite material of the present invention having a porosity of 13%.

This C/C composite material was subjected to heat treatment at 2000° C. in an argon atmosphere in the same manner as in Example 1, and then the abrasion test and the three point flexural test were conducted in the same manner. The results are shown in Table 1.

TABLE 1

| | Flexural strength (kg/mm²) | Carbon fiber content (%) | Pyrolytic carbon formed from a halogenated hydrocarbon-containing gas | PV value* (kgm/cm²·sec) | Number of abrading operations (times) | Average friction coefficient (μ) | Abrasion (mm/time) |
|---|---|---|---|---|---|---|---|
| Example 1 | 12 | 50 | Present | 80 | 100 | 0.28 | 0.001 |
| Example 2 | 11 | 50 | Slighly present | 80 | 100 | 0.27 | 0.001 |
| Comparative Example 1 | 7 | 50 | Absent | 80 | 100 | 0.50 | 0.040 |

*PV value = Surface pressure P (kg/cm²) × circumferential velocity V (m/sec)

We claim:

1. A carbon fiber-reinforced carbon composite material having a porosity of not higher than 20% prepared by subjecting a carbon fiber-reinforced carbon composite material having a porosity of from 25 to 95% to densification treatment, wherein the densification treatment is conducted with pyrolytic carbon formed by the pyrolysis of a halogenated hydrocarbon-containing gas at a temperature of from 400° to 800° C., wherein the pyrolytic carbon formed in the pores of the composite material subjected to the densification treatment has a lattice spacing of graphite crystal of at least 3.7 Å and a crystal thickness of at most 12 Å, as measured by an X-ray diffraction method.

2. The composite material according to claim 1, wherein the densification treatment is conducted with pyrolytic carbon formed by the pyrolysis of a halogenated hydrocarbon-containing gas at a temperature of from 400° to 800° C. and with carbon obtained by the impregnation and baking of a pitch material or a resin.

3. The composite material according to claim 1, wherein the halogenated hydrocarbon is a chlorinated hydrocarbon.

4. The composite material according to claim 1, wherein the porosity of the carbon fiber-reinforced carbon composite material prior to the densification treatment is from 30 to 60%.

5. The composite material according to claim 1, wherein the porosity finally obtained by the densification treatment is from 5 to 15%.

6. The composite material according to claim 1, wherein the halogenated hydrocarbon is dichloroethylene, dichloroethane or trichloroethane.

7. The composite material according to claim 6, wherein the halogenated hydrocarbon is dichloroethylene.

* * * * *